(12) United States Patent
Patwardhan et al.

(10) Patent No.: US 7,548,547 B2
(45) Date of Patent: Jun. 16, 2009

(54) CONTROLLING THE TRANSFER OF TERMINAL SERVER DATA

(75) Inventors: Makarand V. Patwardhan, Redmond, WA (US); Nadim Abdo, Bellevue, WA (US); Mahesh S. Lotlikar, Sammamish, WA (US); Hammad Butt, Bellevue, WA (US); Costin Hagiu, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 572 days.

(21) Appl. No.: 11/394,887

(22) Filed: Mar. 31, 2006

(65) Prior Publication Data

US 2007/0237077 A1   Oct. 11, 2007

(51) Int. Cl.
*H04L 1/00* (2006.01)

(52) U.S. Cl. .................. 370/418; 370/230; 709/225

(58) Field of Classification Search ......... 370/229–231, 370/235, 252–253, 412–418; 709/223–229
See application file for complete search history.

(56) References Cited

U.S. PATENT DOCUMENTS

| | | | |
|---|---|---|---|
| 5,583,995 | A | 12/1996 | Gardner et al. |
| 5,956,322 | A | 9/1999 | Charny |
| 6,195,331 | B1 * | 2/2001 | Tani ........................... 370/230 |
| 6,273,622 | B1 | 8/2001 | Ben-David |
| 6,304,574 | B1 | 10/2001 | Schoo et al. |
| 6,647,419 | B1 | 11/2003 | Mogul |
| 6,850,965 | B2 | 2/2005 | Allen |
| 2002/0035642 | A1 | 3/2002 | Clarke et al. |
| 2003/0026267 | A1 | 2/2003 | Oberman et al. |
| 2005/0091303 | A1 | 4/2005 | Suzuki |
| 2005/0267972 | A1 | 12/2005 | Costa-Requena et al. |

FOREIGN PATENT DOCUMENTS

| | | |
|---|---|---|
| WO | WO 01/67672 A3 | 9/2001 |
| WO | WO 2004/027598 A3 | 4/2004 |

OTHER PUBLICATIONS

F. Silla, J. Duato, A. Sivasubramaniam, C.R. Das "Virtual Channel Multiplexing in Networks of Workstations with Irregular Topology", 8 pages Year: 1998 http://ieeexplore.ieee.org/iel4/5949/15915/00737983.pdf?isNumber=.

Li J.P., Mutka M.W. IngentaConnect "Real-Time Virtual Channel Flow Control", 1 page Journal of Parallel and Distributed Computer, vol. 32, No. 1, Jan. 1996.

Xi Zhang and Kang G. Shin "Second-Order Rate-Based Flow Control with Decoupled Error Control for High-Throughput Transport Protocols", 13 pages Year: 1999 http://www.eecs.umich.edu/techreports/cse/99/CSE-TR-406-99.pdf.

* cited by examiner

*Primary Examiner*—Ricky Ngo
*Assistant Examiner*—Pao Sinkantarakorn
(74) *Attorney, Agent, or Firm*—Workman Nydegger (57) ABSTRACT

The present invention extends to methods, systems, and computer program products for controlling the transfer of terminal server data. In some embodiments, contending request to send terminal server data are resolved by a flow control module situated between a terminal server protocol and a transport/network protocol. The flow control module utilizes channel priorities along with amounts of previously sent data per channel to determine how to distribute bandwidth in a relatively controlled manner between contending channels. The flow control module can be configured to intercept communication between terminal server protocol and a transport/network protocol to facilitate bandwidth distribution. In other embodiments, data is simultaneously sent over multiple channels of terminal server connection. A first write operation obtains a lock on a corresponding channel but the channel lock does not prevent write operations on other channels.

15 Claims, 5 Drawing Sheets

CONTROLLING THE TRANSFER OF TERMINAL SERVER DATA

CROSS-REFERENCE TO RELATED APPLICATIONS

Not Applicable.

BACKGROUND

Background and Relevant Art

Computer systems and related technology affect many aspects of society. Indeed, the computer system's ability to process information has transformed the way we live and work. Computer systems now commonly perform a host of tasks (e.g., word processing, scheduling, and database management) that prior to the advent of the computer system were performed manually. More recently, computer systems have been coupled to one another and to other electronic devices to form both wired and wireless computer networks over which the computer systems and other electronic devices can transfer electronic data. As a result, many tasks performed at a computer system (e.g., voice communication, accessing electronic mail, controlling home electronics, Web browsing, and printing documents) include the communication (e.g., the exchange of electronic messages) between a number of computer systems and/or other electronic devices via wired and/or wireless computer networks.

In many environments, a single computer user has multiple computing devices they use to perform computing tasks. For example, a corporate employee may have a work computer, a home computer, and a laptop. Each of these computer systems may be in and may move between different physical locations. For example, the work computer may be in a corporate building, the home computer may be in the employee's home, and the laptop may be in various different locations as the employee travels. However, the employee may desire uniform access to work related applications and work related data from any of their computer systems in any location.

Thus, it may be that all the applications installed at the work computer are also installed on the home computer and on the laptop. Installing the same applications on all of the employee's computer systems can provide a common look and feel across all the computer systems. Installing the same applications on all the employee's computer systems can also provide access to corporate applications and corporate data access in a uniform fashion across all of the computer systems. However, installing the same application on multiple computer systems also has a number of drawbacks.

A corporation supporting the applications may be required to have a license for each version of an application that is installed. Thus, if a computer user has three computer systems, the corporation is required, at least for some applications, to buy three licensed copies of the application. Additional license must be purchased even if some versions of an application (e.g., on a home computer) are used infrequently. Purchasing additional licenses increases the cost of providing employees with uniform access to corporate applications and corporate data.

Further, a corporation may have limited, if any, control over one or more of the employee's computer systems. For example, a corporation may have limited control over an employee's laptop (even if the laptop is corporate property), since the laptop may be used in various different physical locations (e.g., hotels, airports, etc.) at the discretion of the employee. A corporation may have essentially no control over an employee's home computer system, since the home computer system is in the employee's home. Thus, there is no way to insure that corporate security mechanisms (e.g., firewalls, SPAM filters, virus scanners, etc.) are used to protect one or more of an employee's computer systems, when those one or more computer systems access corporate applications and corporate data. Lack of access to corporate security mechanisms is problematic since a security breach to a non-corporate application or non-corporate data can be propagated corporate applications and data. For example, a virus received in a personal e-mail at a home computer system can be propagated to corporate data when the corporate data is subsequently accessed at the home computer system.

Due at last in part to these cost and security concerns, many corporations (as well as other entities) use terminal servers to provide remote access to applications and data. A terminal server is a computer system that maintains applications that can be remotely executed by client computer systems. Input is entered at a client computer system and transferred over a network (e.g., using protocols based on the ITU T.120 family of protocols, such as, for example, Remote Desktop Protocol ("RDP")) to an application at the terminal server. The application processes the input as if the input was entered at the terminal server. The application generates output in response to the received input and the output is transferred over the network (e.g., also T.120 based protocols) to the client computer system. The client computer system presents the output data. Thus, input is received and output presented at the client computer system, while processing actually occurs at the terminal server.

In most, if not all terminal server environments, input data (entered at a client computer system) typically includes mouse and keyboard data representing commands to an application and output data (generated by an application at the terminal server) typically includes video data for display on a video output device. Many terminal server environments also include functionality that extended protocols (e.g., developed to transfer input and output data) to transfer other types of data.

For example, virtual channels can be used to extend the RDP protocol by allowing plug-ins to transfer data over an RDP connection. Many such extensions exist. For example, features such as printer redirection, clipboard redirection, port redirection, etc., use virtual channel technology. Thus, in addition to input and output data, there may be many virtual channels that need to transfer data. Accordingly, at least from time to time, there may be requests to transfer output data and one or more channel requests to transfer other data contending for available network bandwidth.

A network stack component at the terminal server typically manages bandwidth by maintaining a fixed number of network buffers. When a virtual channel data or output data is to be sent, a corresponding application layer module requests a network buffer for its data. The network stack component allocates a buffer for use by the application layer module.

To transfer data, a virtual channel or module sending output data requests a network buffer from a network level packet driver. For example, an RDP layer can request a network packet from a TCP/IP layer. The RDP layer then fills the network packet with data from the buffer (e.g., virtual channel data or output data) and sends the packet over the network. Once the data is sent to the lowest network layer the network buffer is then freed up for use by the next packet request.

Unfortunately, if no buffers are available when a request is received, the calling application layer module is required to wait until a buffer is available. Further, if multiple contending requests are received, there is typically no controlled mechanism to determine which contending application layer module should get the next available buffer. Some terminal serer environments use synchronization events and thus rely on process schedulers to determine which application layer module is to receive the next buffer. This often causes in arbitrary assignment of the next available buffer to one of a number of contending application layer modules, which is not suitable in many environments. For example, file printing or file copying operations may be given a buffer over display data thereby causing output at a client computer system to be degraded.

Further, at least one terminal server environment allows only one channel to write data at a time. When a server component requests a buffer for writing data, it acquires a lock on the connection, preventing other channels from writing data on the connection.

BRIEF SUMMARY

The present invention extends to methods, systems, and computer program products for controlling the transfer of terminal server data. In some embodiments, it is determined how to allocate bandwidth for transferring terminal server data. A first request to transfer terminal server data for a first application layer module is received. The first application layer module associated with a first priority. It is determined that current bandwidth pressure has caused any buffers configured for transferring terminal server data to be in use. A second request to transfer terminal server data for a second application layer module is received. The second application layer module, is associated with a second priority.

It is determined that the first request and the second request are in contention for the next buffer that is freed up. The number of bytes charged for application layer modules having the first priority during at least the current bandwidth pressure is calculated. The number of bytes charged for application layer modules having the second priority during at least the current bandwidth pressure is calculated. It is detected that a buffer has been freed up. The number of bytes charged for application layer modules having the first priority is compared to the number of bytes charged for application layer modules having the second priority. The buffer is appropriately allocated to transfer terminal server data based on the results of the comparison.

In other embodiments, a plurality of channel writes is performed simultaneously on a terminal server connection. First terminal server data corresponding to a write operation on a first channel of a terminal server connection that includes a plurality of channels is received. A write resource associated with the first channel is locked to prevent other write operations on the first channel without locking write operations other channels of the terminal server connection. Second terminal server data corresponding to a write operation on a second channel of the terminal connection is received. It is determined that a write resource associated with the second channel is not locked. At least a portion of the first terminal server data on the first channel of the terminal server connection and at least a portion of the second terminal server data on the second channel of the terminal server connection are written simultaneously while the write resource associated with the first channel is locked.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

The present invention extends to methods, systems, and computer program products for controlling the transfer of terminal server data. In some embodiments, it is determined how to allocate bandwidth for transferring terminal server data. A first request to transfer terminal server data for a first application layer module is received. The first application layer module associated with a first priority. It is determined that current bandwidth pressure has caused any buffers configured for transferring terminal server data to be in use. A second request to transfer terminal server data for a second application layer module is received. The second application layer module is associated with a second priority.

It is determined that the first request and the second request are in contention for the next buffer that is freed up. The number of bytes charged for application layer modules having the first priority during at least the current bandwidth pressure is calculated. The number of bytes charged for application layer modules having the second priority during at least the current bandwidth pressure is calculated. It is detected that a buffer has been freed up. The number of bytes charged for application layer modules having the first priority is compared to the number of bytes charged for application layer modules having the second priority. The buffer is appropriately allocated to transfer terminal server data based on the results of the comparison.

In other embodiments, a plurality of channel writes is performed simultaneously on a terminal server connection. In other embodiments, a plurality of channel writes is performed simultaneously on a terminal server connection. First terminal server data corresponding to a write-operation on a first channel of a terminal server connection that includes a plurality of channels is received. A write resource associated with the first channel is locked to prevent other write operations on the first channel without locking write operations on other channels of the terminal server connection. Second terminal server data corresponding to a write operation on a second channel of the terminal connection is received. It is determined that a write resource associated with the second channel is not locked. At least a portion of the first terminal server data on the first channel of the terminal server connection and at least a portion of the second terminal server data on the second channel of the terminal server connection are written simultaneously while the write resource associated with the first channel is locked.

Embodiments of the present invention may comprise a special purpose or general-purpose computer including computer hardware, as discussed in greater detail below. Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, computer-readable media can comprise computer-readable storage media, such as, RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

In this description and in the following claims, a "network" is defined as one or more data links that enable the transport of electronic data between computer systems and/or modules. When information is transferred or provided over a network or another communications connection (either hardwired, wireless, or a combination of hardwired or wireless) to a computer, the computer properly views the connection as a computer-readable medium. Thus, by way of example, and not limitation, computer-readable media can comprise a network or data links which can be used to carry or store desired program code means in the form of computer-executable instructions or data structures and which can be accessed by a general purpose or special purpose computer.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, hand-held devices, multi-processor systems, microprocessor-based or programmable consumer electronics, network PCs, minicomputers, mainframe computers, mobile telephones, PDAs, pagers, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 1A:
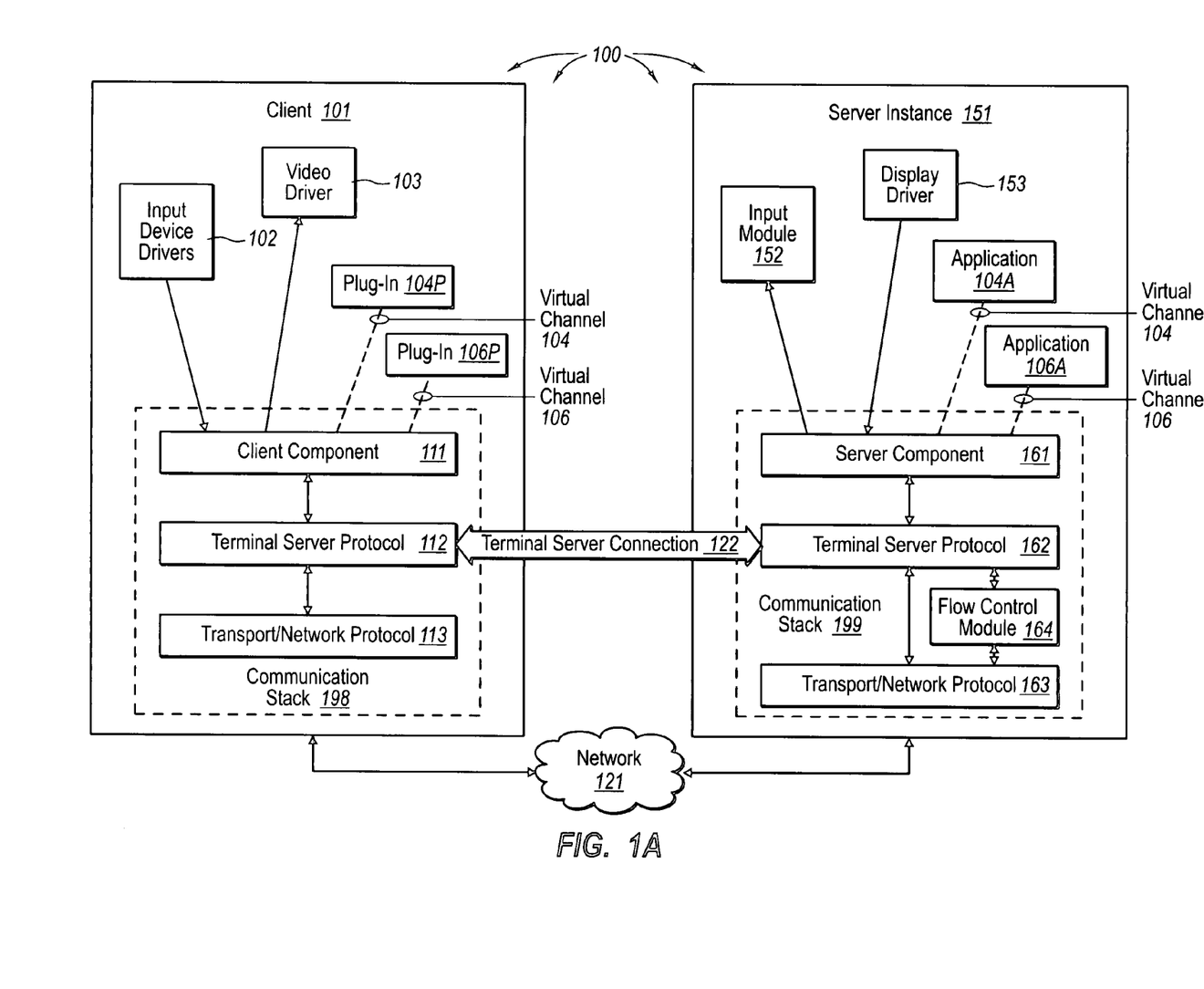
FIG. 1A illustrates an example computer architecture that facilitates controlling the transfer of terminal server data.

FIG. 1A illustrates an example computer architecture 100 that facilitates controlling the transfer of terminal server data. Computer architecture 100 includes client 101 and server instance 151. Each of client 101 and server instance 151 are connected to network 121. Network 121 can be any type of network, such as, for example, a Local Area Network ("LAN"), a Wide Area Network ("WAN"), or even the Internet. Thus, the various components at client 101 and server instance 151 can receive data from and send data to each other, as well as other components connected to network 121. Accordingly, the components can create message related data and exchange message related data (e.g., Internet Protocol ("IP") datagrams and other higher layer protocols that utilize IP datagrams, such as, Transmission Control Protocol ("TCP"), Remote Desktop Protocol ("RDP"), Hypertext Transfer Protocol ("HTTP"), Simple Mail Transfer Protocol ("SMTP"), etc.) over network 121.

Generally, client 101 can be a computer system in communication with server instance 151 for remote execution of applications at server instance 151. Thus, input data (e.g., mouse and keyboard input) representing application commands is received at input device drivers 102. The input data is transferred over network 121 to server instance 151. Input module 152 receives the input data.

Input module 152 supplies the input data to the appropriate application at the serer instance. The application generates output data in response to the input data. Output display data for presentation at a display device is output by display driver 153. The output display data is transferred over network 121 to client 101. Video driver 103 receives the output display data and presents the output display data at a video display device associated with client 101. Thus, input is received and output presented at the client 101, while processing actually occurs at the server instance 151.

Data transferred between plug-ins (e.g., plug-in 104P and plug-in 106P) and corresponding applications (e.g., application 104A and application 106A) can be exchanged over virtual channels e.g., virtual channels 104 and 106) in a similar fashion. A plug-in can send client data to an application and the application can return server data (e.g., results of processing the client data) back to the plug-in. Communication between a plug-in and a corresponding application can facilitate features such as printer redirection, clipboard redirection, port redirection, transfer of multimedia streams, transfer of Universal Serial Bus ("USB") data, etc. Transferring data between plug-ins and corresponding applications can be facilitated over virtual channels, such as, for example, virtual channels 104 and 106 of terminal server connection 122. Thus, it may be that data, in addition to input data and output display data, is exchanged over one or more virtual channels of a terminal server connection.

At client 101, client side data (input data, plug-in data, etc.) for transfer to server instance 151 passes down through the components of communication stack 198. Client side data is first received at client component 111. Client component 111 can mark the client side data such that server component 161 can determine how to process the client side data at server instance 151. For example, client component 111 can mark client side data from plug-in 104P such that server component 161 can determine that the client side data is to be processed by application 104A.

Client component 111 can then request a buffer from terminal server protocol 112. In this description and in the following claims a terminal server protocol is defined as any protocol based on or that extends the ITU T.120 family of protocols, such as, for example, Remote Desktop Protocol ("RDP")). Terminal server protocol 112 can return a buffer to client component 111. Client component 111 can fill the buffer with the client side data and return the buffer to terminal server protocol 112. Terminal server protocol 112 then passes the filled buffer to transport/network protocol 113. In the description and in the following claims a transport/network protocol represents is defined as any combination of transport and network protocols, such as, for example, TCP/IP. Transport/network protocol 113 places the filled buffer in a network packet and sends the network packet, over network 121, to server instance 151.

Server instance 151 receives the network packet and performs essentially the inverse of the operations that were performed at client 101. That is, the received network packet is passed up through the components of communication stack 199. Transport/network protocol 113 receives the network packet, removes the filled buffer from the network packet, and passes the filled buffer to terminal server protocol 161. Terminal server protocol 161 removes the client side data form the buffer and passes the client side data to server component 161. Server component 161 examines the data to determine if the data is marked for input module 152 or for some other application. Based on how the data is marked, server component 161 can send the data to input module 152 or, over an appropriate virtual channel, to an application. For example, if the client side data is from plug-in 104P, server component 161 can send the client side data, over virtual channel 104, to application 104A.

Logically (i.e., abstracted from lower layer protocols) terminal server protocol 112 and terminal server protocol 162 can be viewed as establishing terminal server connection 122 between client 101 and server instance 151.

When the bandwidth of network 121 is not under pressure (e.g., when remaining bandwidth capacity is sufficient to satisfy a further request to transfer data), server side data is transferred back to client 101 similarly to how client side data is transferred to server instance 151. However, when the bandwidth of network 121 is under pressure (e.g., when remaining bandwidth capacity is no sufficient to satisfy a further request to transfer data), flow control module 164 can be utilized to appropriately allocate bandwidth for transferring terminal server data. Generally, flow control module 164 is configured to intercept communication between terminal server protocol 162 and transport/network protocol 163 to facilitate distribution of available bandwidth in a relatively controlled manner. Thus, the functionality of flow control module 164 may be particularly advantageous when a plurality of contending buffer requests is submitted during a period network bandwidth pressure. For example, it may be that two or more buffer requests are submitted to a transport/network protocol when no buffers are available.

Figure 1B:
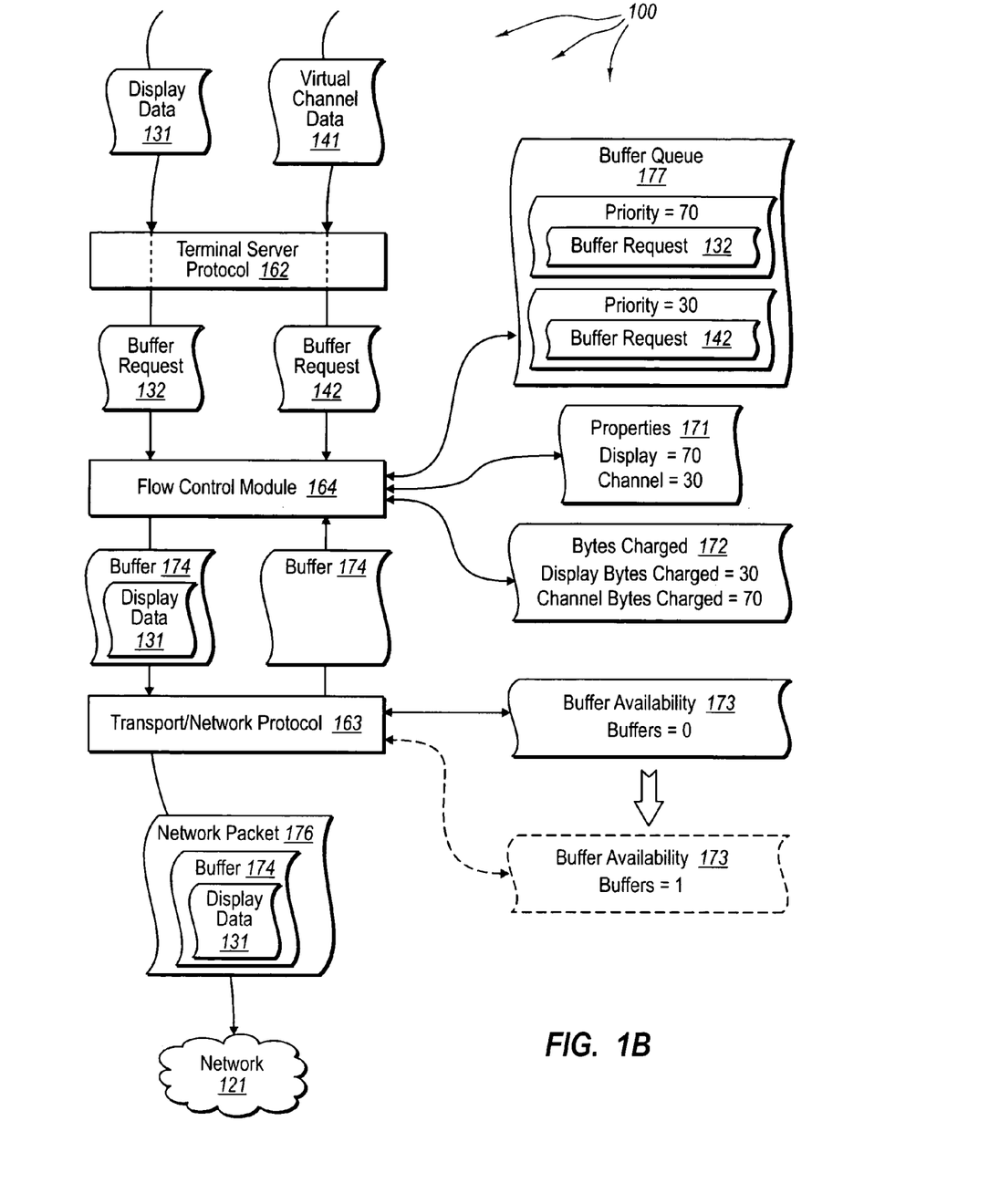
FIG. 1B illustrates a first expanded portion of the example computer architecture from FIG. 1A.
Figure 2:
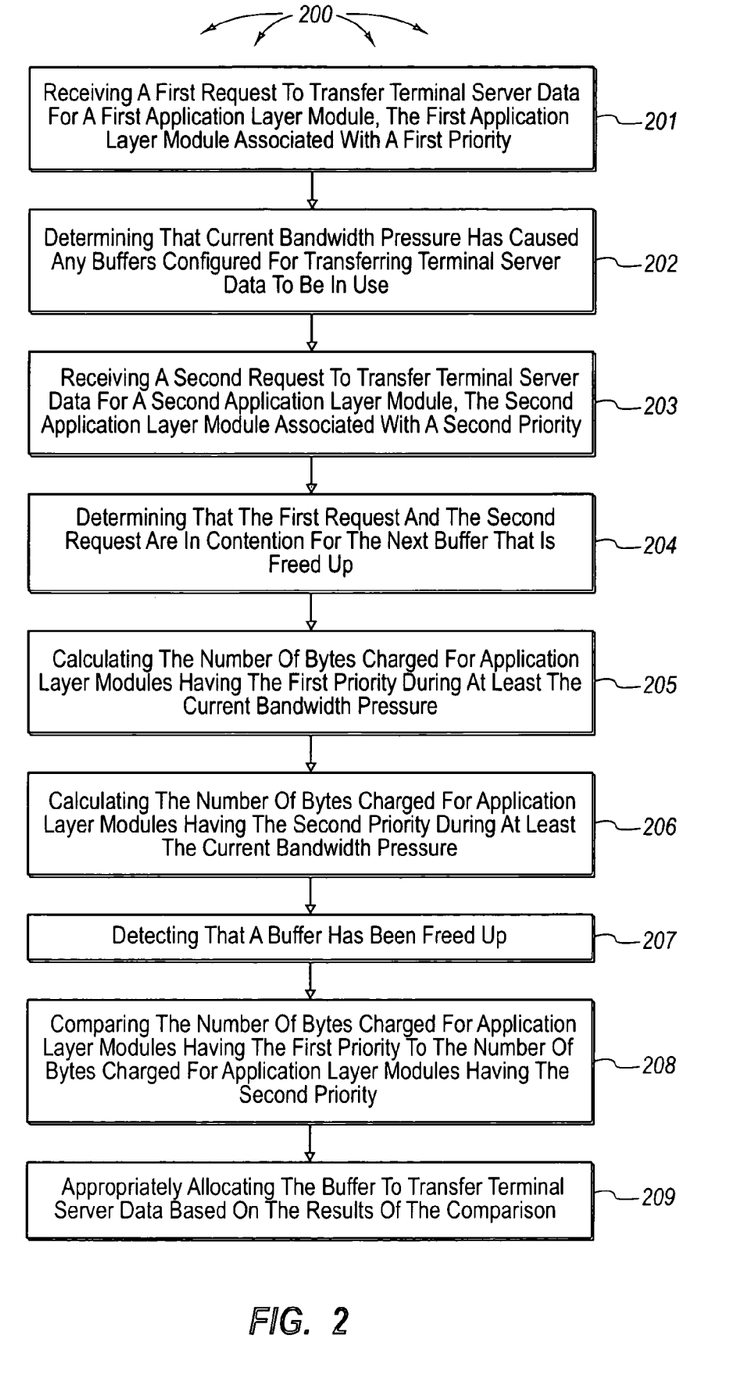
FIG. 2 illustrates a flow chart of an example method for determining how to allocate bandwidth for transferring terminal server data.

FIG. 2 illustrates a flow chart of an example method 200 for determining how to allocate bandwidth for transferring terminal server data. FIG. 1B illustrates a first expanded portion of the example computer architecture 100. The method 200 will be described with respect to the components and data depicted in FIG. 1B.

Method 200 includes an act of receiving a first request to transfer terminal server data for a first application layer module, the first application layer module associated with a first priority (act 201). Referring now to FIG. 1B, flow control module 164 can intercept buffer request 132 from terminal serer 162. Buffer request 132 can be sent from terminal server protocol 162 (and destined for transport/network protocol 163) in response to receiving display data 131 (from display driver 153). Flow control module 164 can refer to priorities 171 to determine that display data has priority 70. Alternately, display data 131 can include an indication that it has priority 70.

Method 200 includes an act of determining that current bandwidth pressure has caused any buffers configured for transferring terminal server data to be in use (act 202). For example, flow control module can request a buffer from transport/network protocol 163. Transport/network protocol 163 can refer to buffer availability 173 to determine if any buffers are available. Transport/network protocol 163 can determine that buffers=0 and thus no buffers are currently available. Flow control module 164 can receive an indication from transport/network protocol 163 that no buffers are available.

In some embodiments, flow control module 164 can maintain a queue of buffer requests, such as, for example, buffer queue 177. Buffer queue 177 can include a list of buffer requests on a per priority basis. In response to receiving an indication that no buffers are available for buffer request 132 (a request to transfer display data), flow control module 164 can insert buffer request 132 into the list for Priority 70. If other buffer requests of priority 70 are subsequently received, those buffer requests can be placed after buffer request 132 in the list for priority 70.

Method 200 includes an act of receiving a second request to transfer terminal server data for a second application layer module, the second application layer module associated with a second priority (act 203). For example, flow control module 164 can intercept buffer request 142. Buffer request 142 can be sent from terminal server protocol 162 (and destined for transport/network protocol 163) in response to receiving virtual channel data 141 (e.g., from application 104A). Flow control module 164 can refer to priorities 171 to determine that virtual channel data has priority 30. Alternately, virtual channel data 141 can include an indication that it has priority 30.

Since no buffers are available for buffer request 142 (a request to transfer virtual channel data), flow control module 164 may insert buffer request 142 into the list for Priority 30 (in buffer queue 177). If other buffer requests of priority 30 are subsequently received (e.g., requests form other virtual channels), those buffer requests can be placed after buffer request 142 in the list for priority 30

Method 200 includes an act of determining that the first request and the second request are in contention for the next buffer that is freed up (act 204). For example, flow control module 164 can determine that buffer request 132 and buffer request 142 are in contention for the next buffer available from transport/network protocol 163.

Method 200 includes an act of calculating the number of bytes charged for application layer modules having the first priority during at least the current bandwidth pressure (act 205). For example, flow control module 164 can calculate the bytes charged to application layer modules having priority 70 at least for a current period of buffer unavailability experienced by transport/network protocol 163. Method 200 includes an act of calculating the number of bytes charged for application-layer modules having the second priority during at least the current bandwidth pressure (act 206). For example, flow control module 164 can calculate the bytes charged to application layer modules having priority 30 at least for a current period of buffer unavailability experienced by transport/network protocol 163.

Generally every time a number bytes are sent on a given priority, the bytes charged for that priority is incremented by the number of bytes. Charging a priority X for bytes used can be facilitated in accordance with the following equation:

BytesCharged+=
    BytesUsed*AllocationFactor_ForPriorityX

For example when Priority_Display has allocation of 70% and Priority_Channel has allocation of 30% thus 7 bytes sent on Display are equivalent to 3 bytes sent on Channel. Thus, AllocationFactor for Display can be 3 and AllocationFactor for Channel can be 7. Thus, when both of them send 10 bytes each, the bytes charged will be as follows:

Display_Bytes_Charged=10*3=30

Channel_Bytes_Charged=10*70=70

A current calculation of the bytes charged per priority can be stored in bytes charged 172.

The bytes charged for each priority can be rationalized. Thus, when there are two priorities with charges of 30 and 70 respectively, these charges can be stored in rationalized format of 0 and 40. Rationalization of byte charges can simplify the maintenance by retaining the 0 charge for the least charged priority.

Method 200 includes an act of detecting that a buffer has been freed up (act 207). For example, in response to a current network packet reaching its destination, transport/network protocol 163 can receive an indication that a buffer is now available. Transport/network protocol 163 can increment buffer availability 173 (as indicated in the version surrounded by the dashed line) to represent that one buffer is now available. Since transport/network protocol 163 has outstanding buffer requests, transport/network protocol 163 can send buffer 174 to terminal server protocol 162. Flow control module 164 can intercept buffer 174.

Method 200 includes an act of comparing the number of bytes charged for application layer modules having the first priority to the number of bytes charged for application layer modules having the second priority (act 208). For example, flow control module 164 can refer to bytes charged 172 to compare the number of bytes charged to priority 70 (display data) to number of bytes charged to priority 30 (virtually channel data). Thus, flow control module 164 can compare 0 charged bytes (i.e., 30–30) for display to 40 charged bytes (i.e., 70–30) for virtual channels. Since the bytes charged values were previously weighted using allocation factors, direct comparisons are possible.

Method 200 includes an act of appropriately allocating the buffer to transfer terminal server data based on the results of the comparison (act 209). For example, based on the charge bytes for display being 30 and the charged bytes for virtual channels being 70, flow control module 164 can allocate buffer 174 for buffer request 132. As such display data 131 can be placed in buffer 174 and passed onto to transport/network protocol 163. Transport/network protocol 163 can in turn place buffer 174 in network packet 176 and transfer network packet 176 over network 111 (e.g., to video driver 103).

If, for example, charge bytes for display had been 80, flow control module 164 can allocate buffer 174 for buffer request 142. Virtual channel data 141 can then be smartly transferred over network 111 (e.g., to plug-in 104P).

Embodiments of the present invention can include a bandwidth scheduler, for example, including in existing buffer management modules. The bandwidth schedule can schedule the allocation of buffers based on priorities. When under bandwidth pressure the bandwidth scheduler can distribute the bandwidth-among the requests, for example, using the following scheme:

| Priority | Reserved Bandwidth | Notes |
|---|---|---|
| Priority_Display | 70 | When there is a contention for bandwidth 70% of the bandwidth is reserved for Display |
| Priority_Channel | 30 | When there is a contention for bandwidth 30% of the bandwidth is reserved for Channels |

It may be that a bandwidth scheduler is invoked in periods of bandwidth pressure, such as, for example, when the number of requested outbound buffers exceeds the number of available outbound buffers. When there is no bandwidth pressure, use of the bandwidth schedule may be by-passed.

New routines can be implemented in buffer management modules to facilitate bandwidth scheduling. These new routines can accept "priority" as an additional parameter. Stack drivers, when requesting bandwidth, can include a "priority" for each buffer request. For compatibility with older clients existing buffer management routines can be retained. However, existing buffer management routines can be modified to forward buffer requests to new routines. For example, existing buffer management routines can be modified to include a call to new routines. When calling a new routine, an existing routine can provide a default "priority" (e.g, priority=Priority_Med) as input to the new routine. Accordingly, behavior in existing routines that treats all requests equally can be retained when appropriate.

Data structures representing channels can be augmented with a field for storing priority. Priorities can be set dynamically through routines that are configured to modify the value of a priority field. Data structures representing other types of data, such as, for example, multimedia/USB data can also be augmented with a field for storing priority. They can priorities can likewise be set dynamically through routines that are configured to modify the value of a priority field.

Buffers can be allocated based on priority. If there are multiple channels contending within a same priority level they can be served in a first in first out ("FIFO") basis. For example, according the order they were included in buffer queue 177.

At least in some network environments, network bandwidth pressure is not constant. That is, there are times when the number of available buffers is sufficient to satisfy existing buffer requests. For example, it may be that only one channel X (say on Priority A) is using all the available bandwidth because there is nobody else who has any data to send. However, there may be another channel Y (on priority B) that doesn't have any data to send yet. If, after 100 K bytes have been sent on the channel X, channel Y starts sending data it may be inappropriate to charge the 100 K bytes against channel X since there was no contention when the 100 K bytes were sent. To mitigate, and potentially avoid, such an occurrence, embodiments of the invention can utilize both active and inactive priorities. For effective distribution of bandwidth BytesCharged can be maintained relative to the currently active channels.

A priority can be considered active if data associated with the priority has been sent over a specified time frame, such as, for example, within a range of 1 to 6 seconds. BytesCharged can be normalized among active priorities. For example, if there are two active priorities with the BytesCharged 1000 and 2000 respectively, these values can be normalized to 0 and 1000 respectively. These mechanisms help ensure that the bandwidth scheduling is done only among contending channels. If there is no contention, the ByteCharged on the only priority using the bandwidth can remain 0. Even during contention, only those bytes sent over the specified period (e.g., within a range of 1 to 6 seconds) are changed against the priority.

Embodiments can also include mechanisms to avoid relatively large byte charges on active channels. For example, it may be that channel A is sending data at 10 Kbps and Channel B is sending data at 100 Kbps. However, channel A and channel B may be assigned the same priority. Thus, on a 100 Kbps link bandwidth distribution can be 10 Kbps for A and 90 Kbps for B. Since channel A has more bandwidth allocated (50 Kbps) than it is using, the charge on channel B will keep on accumulating and may go unbounded. To avoid such accumulation Channel A can receive a pass credit.

Pass credit can be credit given to a channel, when the other channel doesn't have any data to send when it turn comes. Thus, when channel B has its turn to send data; but doesn't have anything to send the pass credit is given to Channel A, it can be calculated as follows:

PassCredit=ChargeOnChannel$A$/2

ChargeOnChannel$A$=ChargeOnChannel$A$−PassCredit.

This helps to ensure that no charges go unbounded. Pass credit is can be given against old charges; thus reducing their effect over time. This facilitates a bandwidth distribution scheme in which given a constant packet size; maxCharge<2*PacketSize.

Figure 1C:
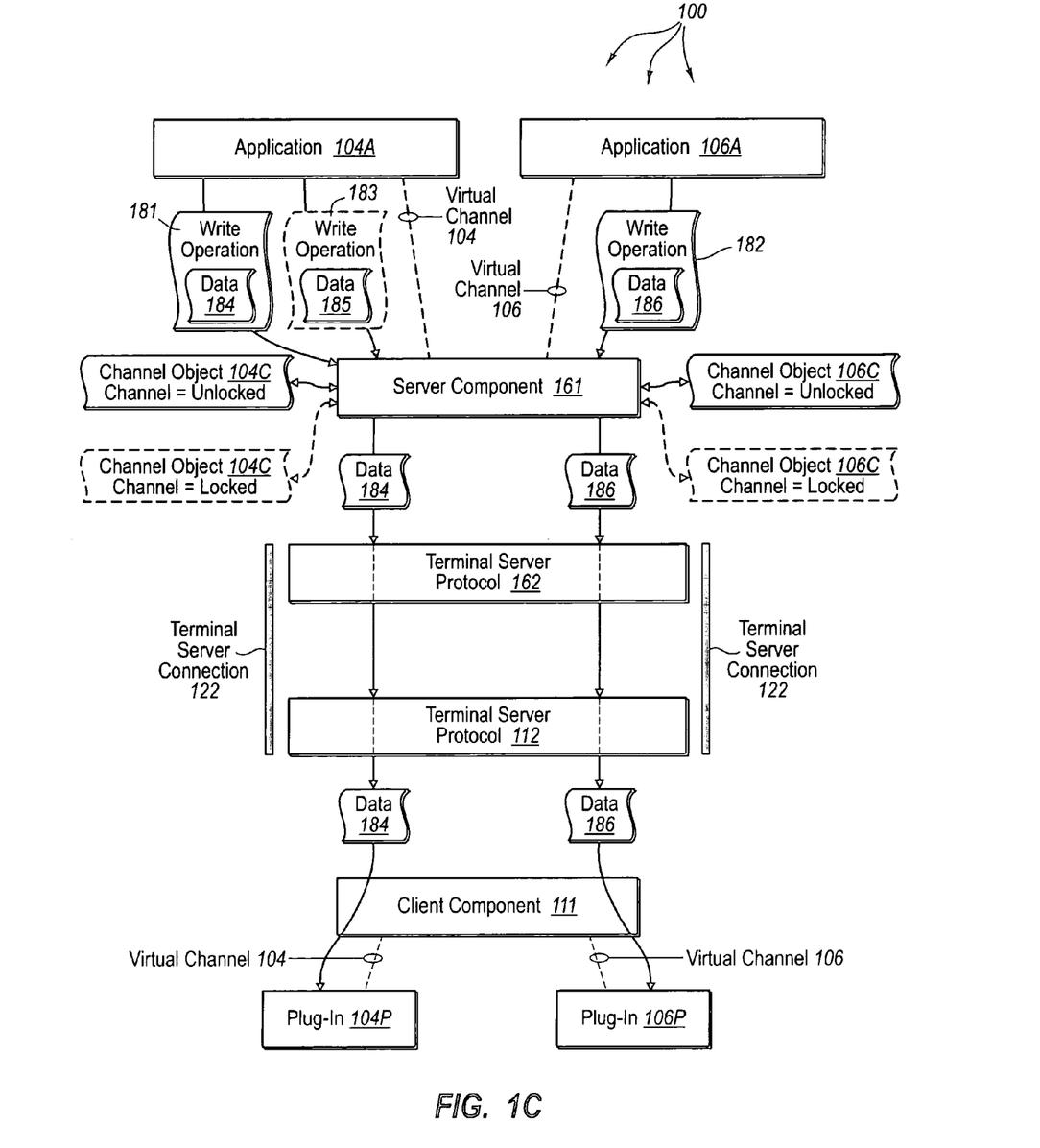
FIG. 1C illustrates a second expanded portion of the example computer architecture from FIG. 1A.
Figure 3:
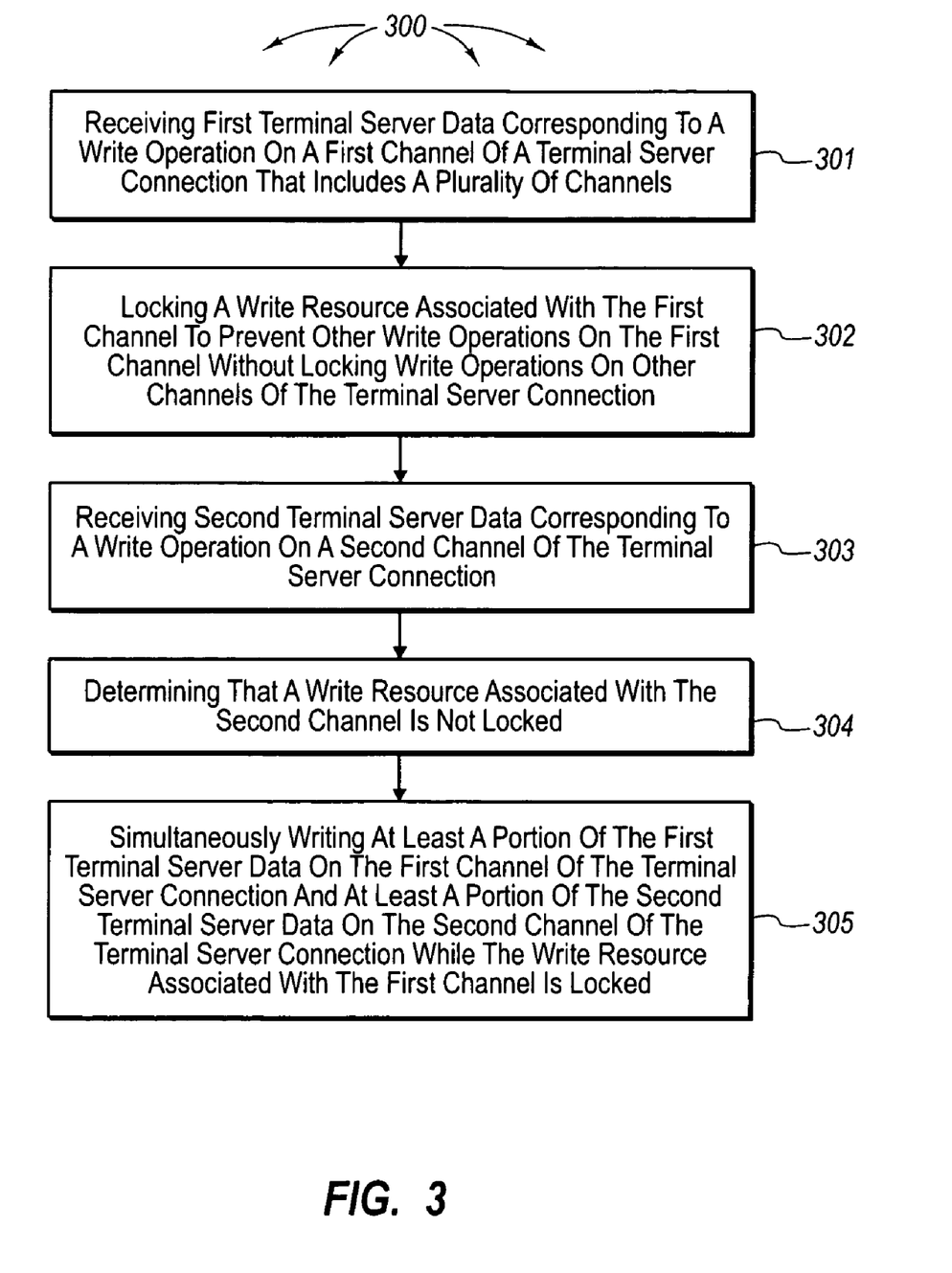
FIG. 3 illustrates a flow chart of an example method for simultaneously performing a plurality of channel writes on a terminal server connection.

FIG. 3 illustrates a flow chart of an example method 300 for simultaneously performing a plurality of channel writes on a terminal server connection. FIG. 1C illustrates a second expanded portion of the example computer architecture 100. The method 300 will be described with respect to the components and data depicted in FIG. 1C.

Method 300 includes an act of receiving first terminal server data corresponding to a write operation on a first channel of a terminal server connection that includes a plurality of channels (act 301). For example, server component 161 can receive write operation 181, including data 184, over virtual channel 104 from application 104A.

Method 300 includes an act of locking a write resource associated with the first channel to prevent other write operations on the first channel without locking write operations on other channels of the terminal connection (act 302). Server component 161 can maintain channel data structure per channel. Each maintained channel data structure can include a resource in to indicate if writes on the channel are locked. When there are no active writes on a channel, the resource can indicate that the channel is unlocked. For example, channel object 104C can indicate that virtual channel 104 is unlocked. Likewise, channel object 106C can indicate that virtual channel 106 is unlocked.

In some embodiments, the channel data structure each channel is of the format:

```
typedef struct _ICA_CHANNEL {
    ICA_HEADER  Header;
    LONG        RefCount;
    ERESOURCE   Resource;
    ERESOURCE   WriteResource;
```

-continued

```
    :
    :
}
``` where "WriteResource" is the resource that indicates if a channel is locked or unlocked. WriteResource can be set on a per channel basis without having to lock an entire terminal serer connection, such as, for example, terminal server connection 122.

Accordingly, in response, to receiving write operation 181, server component 161 can modify the value of channel object 104C (as indicated in the version surround by the dashed line) to lock further write operations on virtual channel 104. Thus, if write operation 183 is subsequently received before write operation 181 completes, data 185 will not be written over virtual channel 104.

Method 300 includes an act of receiving second terminal server data corresponding to a write operation on a second channel of the terminal server connection (act 303). For example, server component 161 can receive write operation 182, including data 183, over virtual channel 106 from application 106A. Method. 300 includes an act of determining that a write resource associated with the second channel is not locked (act 304). For example, server component 161 refer to the that the value of channel object 106C to determine that write operations on virtual channel 106 are not locked. Server component 161 can accept write operation 182 and subsequently modify the value of channel object 106C (as indicated in the version surround by the dashed line) to lock further write operations on virtual channel 106.

Method 300 includes an act of simultaneously writing the at least a portion of the first terminal server data on the first channel of the connection and at least a portion of the second terminal server data on the second channel while the write resource associated with the first channel is locked. For example, server component 161 can simultaneously transfer a portion of data 184 over virtual channel 104 and a portion of data 186 over virtual channel 106, while channel object 104C indicates that virtual channel 104 is locked for write operations. Thus, locking virtual channel 104 does not lock other channels of terminal serer connection 122 and does not prevent write operations on other channels.

Data 184 and data 186 can be sent to terminal server protocol 162, simultaneously sent over terminal server connection 122, and received at terminal server protocol 111. Terminal server protocol 111 can pass data 184 and data 186 over virtually channels 104 and 106 to plug-in 104P and plug-in 106P respectively.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. At a computer system, a method for determining how to allocate bandwidth for transferring terminal server data, the method comprising:

receiving a first request to transfer terminal server data for a first application layer module, the first application layer module associated with a first priority;

determining that current bandwidth pressure has caused any buffers configured for transferring terminal server data to be in use;

receiving a second request to transfer terminal server data for a second application layer module, the second application layer module associated with a second priority;

determining that the first request and the second request are in contention for the next buffer that is freed up;

a processor calculating the number of bytes charged for application layer modules having the first priority during at least the current bandwidth pressure;

the processor calculating the number of bytes charged for application layer modules having the second priority during at least the current bandwidth pressure;

detecting that a buffer has been freed up;

the processor comparing the number of bytes charged for application layer modules having the first priority to the number of bytes charged for application layer modules having the second priority; and appropriately allocating the buffer to transfer terminal server data based on the results of the comparison.

2. The method as recited in claim 1, wherein receiving a first request to transfer terminal server data for a first application layer module comprises receiving a request to send display data for presentation at a client.

3. The method as recited in claim 1, wherein receiving a first request to transfer terminal server data for a first application layer module comprises intercepting a buffer request sent from a terminal server protocol to a transport/network protocol.

4. The method as recited in claim 3, wherein intercepting a buffer request sent from a terminal server protocol to a transport/network protocol comprises intercepting a buffer request sent from remote desktop protocol to TCP/IP.

5. The method as recited in claim 1, wherein receiving a second request to transfer terminal server data for a second application layer module comprises receiving a request to send virtual channel data to a client.

6. The method as recited in claim 1, wherein determining that the first request and the second request are in contention for the next buffer that is freed up comprises receiving the first request and the second request when no buffers are available.

7. The method as recited in claim 1, wherein calculating the number of bytes charged for application layer modules having the first priority during at least the current bandwidth pressure comprises calculating number of bytes charged for application layer modules having the first priority during a specified period of time.

8. The method as recited in claim 1, wherein calculating the number of bytes charged for application layer modules having the first priority during at least the current bandwidth pressure comprises calculating number of bytes charged for application layer modules having the first priority in accordance with a specified allocation factor of the priority such that bytes changed can be directly compared to bytes charged for other priorities.

9. The method as recited in claim 1, wherein detecting that a buffer has been freed up comprises intercepting a buffer that was sent from a transport/network protocol to terminal server protocol.

10. The method as recited in claim 1, wherein comparing the number of bytes charged for application layer modules having the first priority to the number of bytes charged for application layer modules having the second priority comprises comparing bytes charge for display data to bytes charged for virtual channel data.

11. The method as recited in claim 1, wherein appropriately allocating the buffer to transfer terminal server data based on the results of the comparison comprises allocating the buffer to the first request.

12. The method as recited in claim 11, further comprising:
filling the buffer with terminal server data for the first application layer module; and
sending the buffer to transport/network protocol for delivery to a client.

13. The method as recited in claim 1, further comprising:
including the first request in a buffer queue list corresponding to the first priority; and
including the second request in a buffer queue list corresponding to the second priority.

14. A computer system, comprising:
one or more processors;
system memory; and
one or more computer-readable media having stored thereon a terminal server flow control module, the terminal server flow control module being including in a communication stack situated between a terminal server protocol and a transport/network protocol, the terminal server flow control module configured to intercept communication between the terminal server protocol and a transport/network protocol to perform the following:
receive a first request to transfer terminal server data for a first application layer module, the first application layer module associated with a first priority;
determine that current bandwidth pressure has caused any buffers configured for transferring terminal server data to be in use;
receive a second request to transfer terminal server data for a second application layer module, the second application layer module associated with a second priority;
determine that the first request and the second request are in contention for the next buffer that is freed up;
calculate the number of bytes charged for application layer modules having the first priority during at least the current bandwidth pressure;
calculate the number of bytes charged for application layer modules having the second priority during at least the current bandwidth pressure;
detect that a buffer has been freed up;
compare the number of bytes charged for application layer modules having the first priority to the number of bytes charged for application layer modules having the second priority; and
appropriately allocate the buffer to transfer terminal server data based on the results of the comparison.

15. The computer system as recited in claim 14, wherein the terminal server flow control module being configured to intercept communication between the terminal server protocol and a transport/network protocol comprises the terminal server flow control module being configured to intercept communication between the remote desktop protocol and TCP/IP.

* * * * *